United States Patent
Nguyen (10) Patent No.: US 7,561,306 B2
(45) Date of Patent: Jul. 14, 2009

(54) ONE-DIMENSIONAL LENS SHADING CORRECTION

(75) Inventor: Hugh Phu Nguyen, San Jose, CA (US)

(73) Assignee: Nethra Imaging Inc., Santa Clara, CA (US)

( * ) Notice: Subject to any disclaimer, the term of this patent is extended or adjusted under 35 U.S.C. 154(b) by 371 days.

(21) Appl. No.: 11/407,449

(22) Filed: Apr. 19, 2006

(65) Prior Publication Data

US 2007/0247672 A1    Oct. 25, 2007

(51) Int. Cl.
*H04N 1/46* (2006.01)
(52) U.S. Cl. .................. 358/2.1; 358/504; 348/251
(58) Field of Classification Search .............. 358/1.9, 358/2.1, 461, 504, 406, 1.16; 348/251, 615
See application file for complete search history.

(56) References Cited

U.S. PATENT DOCUMENTS

2004/0257454 A1* 12/2004 Pinto et al. ............... 348/222.1

FOREIGN PATENT DOCUMENTS

JP    2003060183 A   *   2/2003

* cited by examiner

*Primary Examiner*—Thomas D Lee
*Assistant Examiner*—Stephen M Brinich
(74) *Attorney, Agent, or Firm*—Hahn and Moodley LLP (57) ABSTRACT

In one embodiment, a method for correcting image data for a captured image for lens shading artifacts is provided. The method comprises determining a plurality of one dimensional correction curves that can be applied to the image data to correct for lens shading artifacts therein; and correcting the image data for lens shading artifacts based on the one dimensional curves.

17 Claims, 14 Drawing Sheets

Figure 8 $L_{y_0}(x)$ at the y coordinate $y = y_0$

Figure 9 Corrected data for the horizontal line at the y coordinate $y = y_0$

Figure 10  $L_{y_i}(x)$ at the y coordinate $y = y_i$

Figure 11 "Morphing" of $L_{y_0}(x)$ into $L_{y_i}(x)$

Figure 12  Lens Shading Effect of a Misaligned Lens

Figure 13  $L_{y_0}(x)$ and $L_{y_i}(x)$ of some lens system

Figure 14 Cutting $L_{y_0}(x)$ and $L_{y_i}(x)$ into more segments

ONE-DIMENSIONAL LENS SHADING CORRECTION

FIELD

Embodiments of the invention relate to a method and system to correct an image for artifacts due to lens shading.

BACKGROUND

Figure 1:
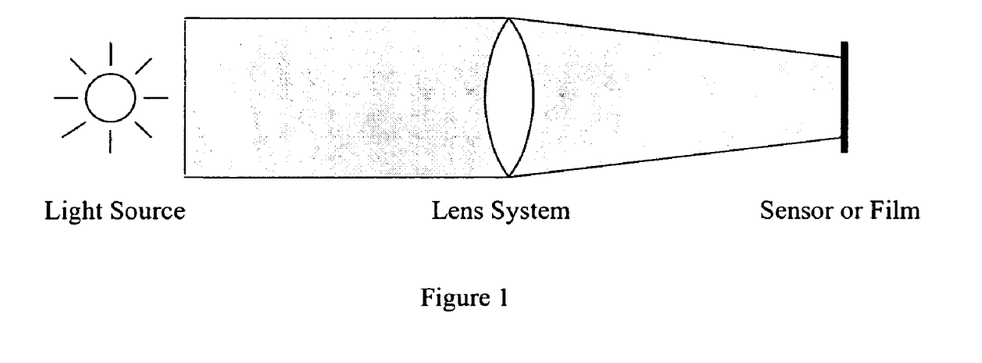
FIG. 1 shows an image capturing system.
Figure 2:
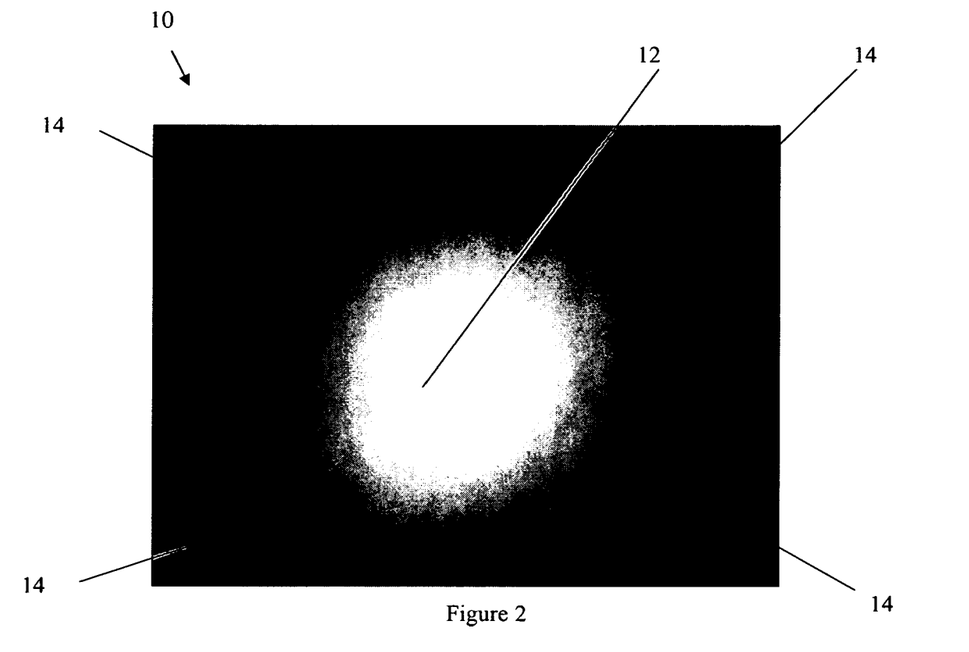
FIG. 2 illustrates the lens shading artifact.

In image capturing systems involving the lenses such as the one shown in FIG. 1 of the drawings, the light distribution by the lens system is non-uniform, causing a captured image to have some light intensity fall-off toward the edges of the image. This artifact is called the lens shading artifact or vignette. FIG. 2 of the drawings illustrates the effect of the lens shading artifact on a captured image. Referring to FIG. 2, it will be seen that a captured image 10 includes a central circular region 12. Light intensity is brightest at the center of the circular region 12 and falls off radially away from the center. Edges 14 at the corners at the image 10 show the greatest fall off in light intensity.

The lens shading artifact may be removed by multiplying the light intensity I(x,y) at the image location (x,y) by a lens shading correction amount L(x,y)

$$I_{corrected}(x,y) = I(x,y) \times L(x,y) \qquad (1)$$

In reality, for image capturing systems that include an image sensor, the sensor might contribute offset terms that would make the Equation (1) more complex. The offset terms are not considered so as to not to obscure the invention. However, one skilled in the art will know how to modify Equation (1) with the offset terms.

In one technique to correct for the lens shading artifact known to the inventor, the lens shading artifact is modeled so that the function L(x,y) may be inferred from the model. In another technique to correct for the lens shading artifact, the function L(x,y) is directly measured and calculated. With both these techniques, the function L(x,y) is a two dimensional (2D) function that depends on both x and y coordinates.

SUMMARY

In one embodiment, a method for correcting image data for a captured image for lens shading artifacts is provided. The method comprises determining a plurality of one dimensional correction curves that can be applied to the image data to correct for lens shading artifacts therein; and correcting the image data for lens shading artifacts based on the one dimensional curves.

Other aspects of the invention will be apparent from the detailed description below.

BRIEF DESCRIPTION OF THE DRAWINGS

Embodiments of the invention will now be described, by way of example, with reference to the accompanying diagrammatic drawings, in which.

DETAILED DESCRIPTION

In the following description, for purposes of explanation, numerous specific details are set forth in order to provide a thorough understanding of the invention. It will be apparent, however, to one skilled in the art, that the invention may be practiced without these specific details. In other instances, structures and devices are shown at block diagram form only in order to avoid obscuring the invention.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Embodiments of the present invention disclose a method to correct lens shading artifacts by using two one dimensional (1D) functions $L_h(x)$ and $L_v(y)$ instead of a single 2D function L(x,y). An advantage of this method is that it is much easier and cheaper to compute two 1D functions than one 2D function. Moreover, if the functions are implemented as tables, then advantageously the present invention requires much less storage. For example, if the image size is 1000×1000, then two full 1D tables take 2×1000 or 2000 entries. On the other hand, the 2D table would take 1000×1000 or 1000000 entries.

Embodiments of the present invention also cover an image processor that corrects an image for lens shading artifacts contained therein, in accordance with the techniques of the present invention. Some embodiments also cover a camera system that includes such an image processor.

Figure 3:
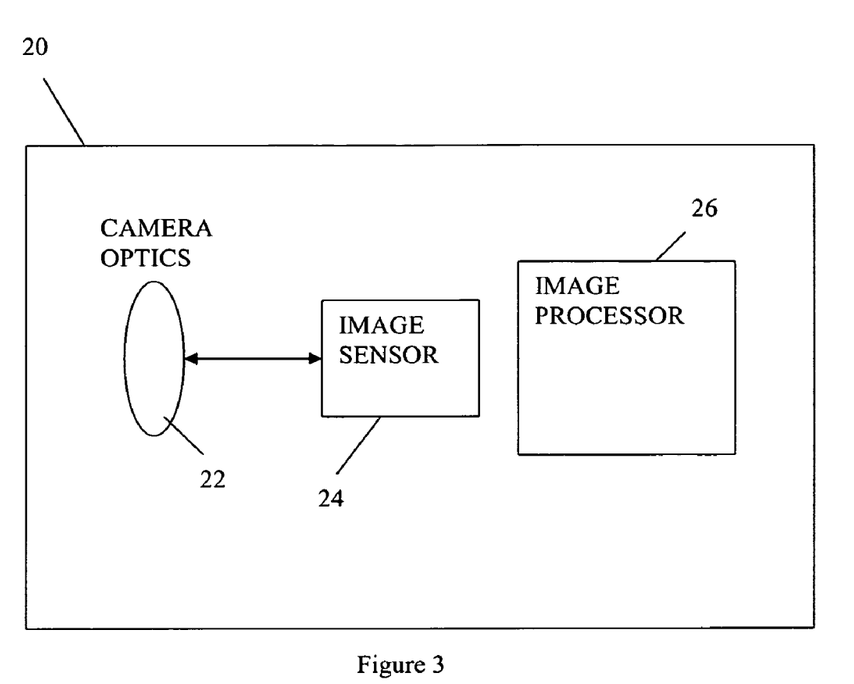
FIG. 3 shows a high-level block diagram of a camera system, in accordance with one embodiment of the invention.
Figure 4:
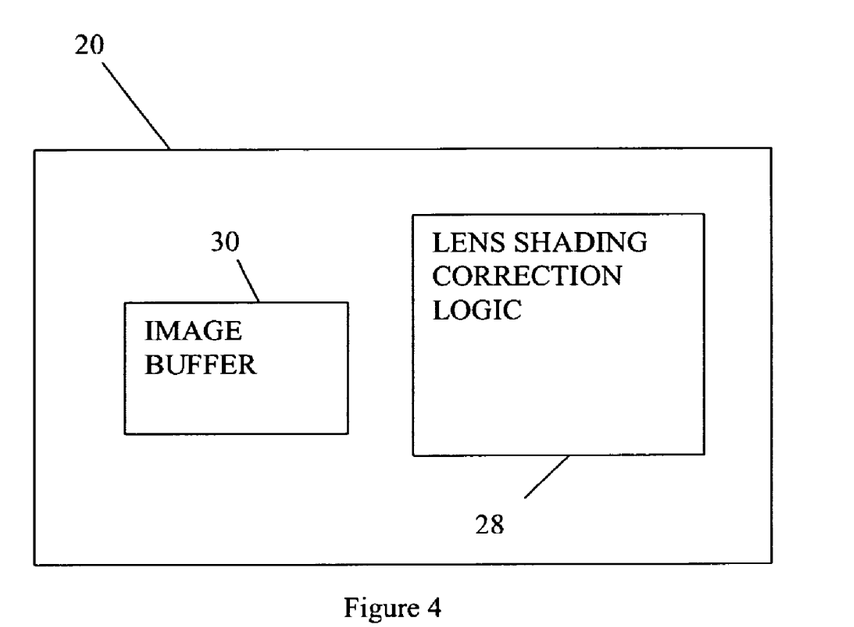
FIG. 4 shows a high-level block diagram of an image processor, in accordance with one embodiment of the invention.

Turning now to FIG. 3 of the drawings, there is shown a camera system 20 in accordance with one embodiment of the invention. The camera system 20 includes camera optics 22 coupled to an image sensor 24. The image sensor 24 is in turn coupled to an image processor 26. As will be seen from FIG. 3 of the drawings, the image processor 26 includes lens shading correction logic 28, and an image buffer 30, among other components that have not been shown so as not to obscure the invention, but which components one of ordinary skill in the art would understand to form part of the image processor 26. The lens shading correction logic 28 may be implemented in software, hardware, or a combination of both software and hardware.

Figure 5:
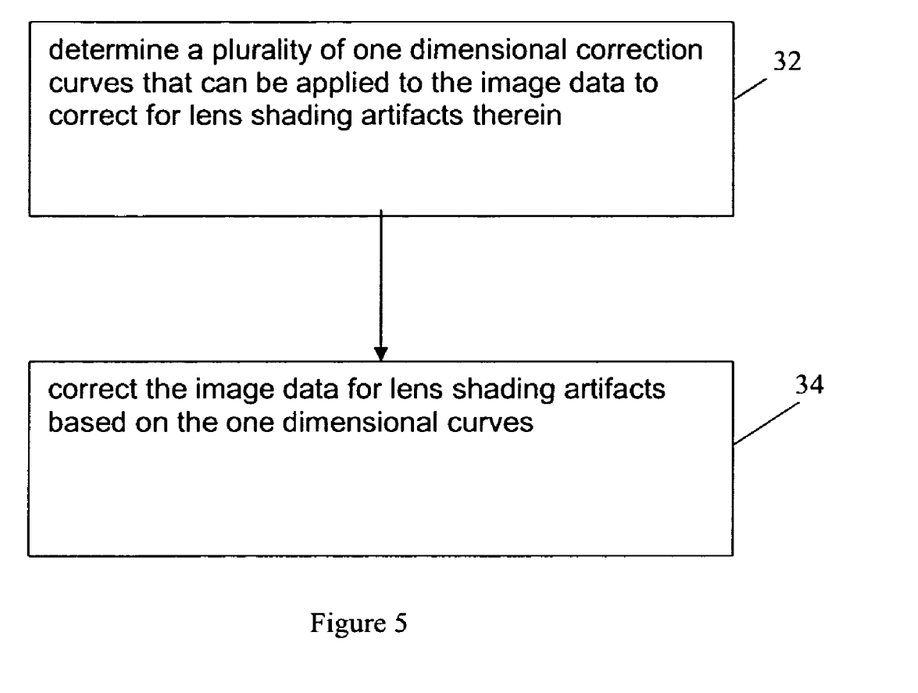
FIG. 5 shows a flowchart for a lens shading correction technique; in accordance with one embodiment of the invention.

In one embodiment, the lens shading correction logic 28 performs a method for correcting image data for a captured image for lens shading artifacts. This method is illustrated in the flowchart of FIG. 5 of the drawings. Referring to FIG. 5, it will be seen that at block 32, the lens shading correction logic 28 determines a plurality of one dimensional correction curves that can be applied to the image data to correct for lens shading artifacts therein. Thereafter, at block 34 the lens shading correction logic 28 corrects the image data for lens shading artifacts based on the one dimensional curves.

In accordance with one embodiment of the invention, operation of the lens shading correction logic 28 is based on the following equation that is modeled on Equation (1):

$$I_{corrected}(x,y) = I(x,y) \times C_h(x,y) \times L_h(x) \times C_v(x,y) \times L_v(y) \quad (2)$$

In one embodiment both functions $C_h(x,y)$ and $C_v(x,y)$ are carefully selected so that they require very simple logic and very minimal storage to compute. Advantageously the computation of the Equation (2) is much simpler and cheaper than the Equation (1).

In accordance with the techniques of the present invention, a 2D image is corrected in two steps: one step makes the correction in the horizontal direction with the terms $C_h(x,y) \times L_h(x)$, and the second step makes the correction in the vertical direction with the terms $C_v(x,y) \times L_v(y)$. The horizontal correction and the vertical direction are treated independently of each other. Moreover, since the horizontal and the vertical corrections are similar, the logic for one correction may be reused for the other. In the description that follows, only the computation of $C_h(x,y)$ and $L_h(x)$ is described. The computation of $C_v(x,y)$ and $L_v(y)$ is not described as it is analogous to the computation of $C_h(x,y)$ and $L_h(x)$.

The Function $L_h(x)$

Figure 6:
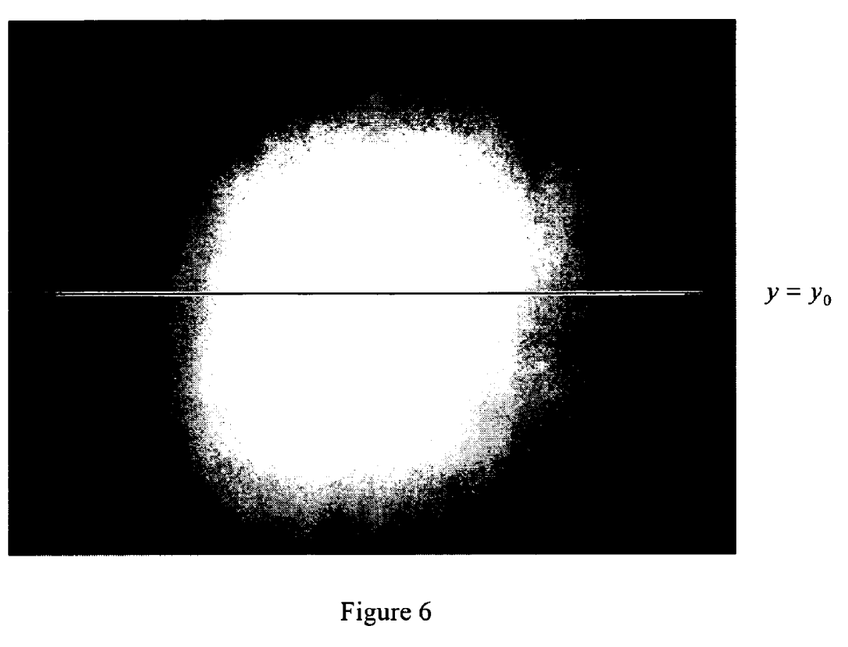
FIGS. 6 to 14 illustrate how lens shading correction techniques, in accordance with embodiments of the invention may be used to correct an image for lens shading artifacts.

For a uniform light source an image capturing system such as is shown in FIG. 1 of the drawings, will produce an image similar to that of FIG. 2. For this image, for a line across the image horizontally at y coordinate $y=y_0$ as in FIG. 6, a plot of the intensities of the pixels along the line versus the x positions of the pixels would result in a curve similar to that shown in FIG. 7

Figure 7:
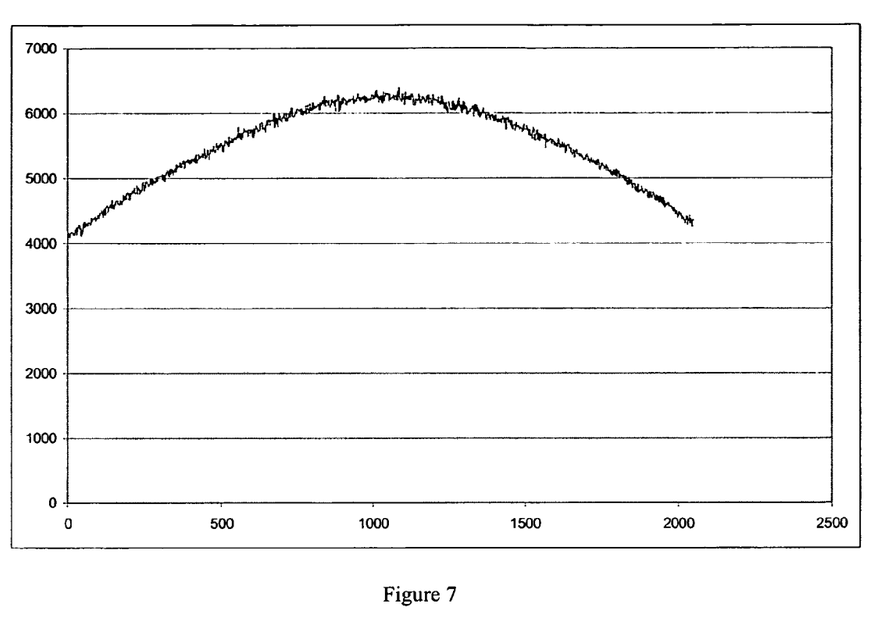

To perform a lens shading correction on the 1-dimensional data in FIG. 7, the inverse of the curve is applied to the curve itself, thereby to straighten the curve. Since the data are taken by actual measurements, the data are not smooth. In one embodiment, noise in the data is removed by fitting a smooth curve to the data.

Figure 8:
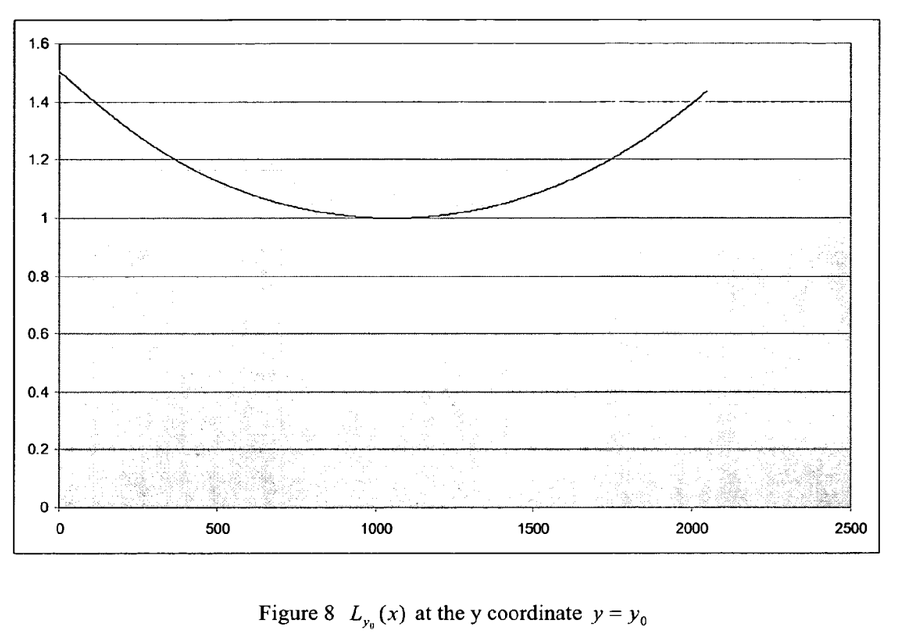

If the smooth curve is $S(x)$, and its maximum value is $S_{max}$ then the correction curve should be $$L_{y_0}(x) = \frac{S_{max}}{S(x)}$$

so that multiplying the correction curve $L_{y_0}(x)$ with $S(x)$ would yield a constant $S_{max}$ regardless of the position x. FIG. 8 shows the horizontal correction curve $L_{y_0}(x)$ for the horizontal line at the y coordinate $y=y_0$.

Figure 9:
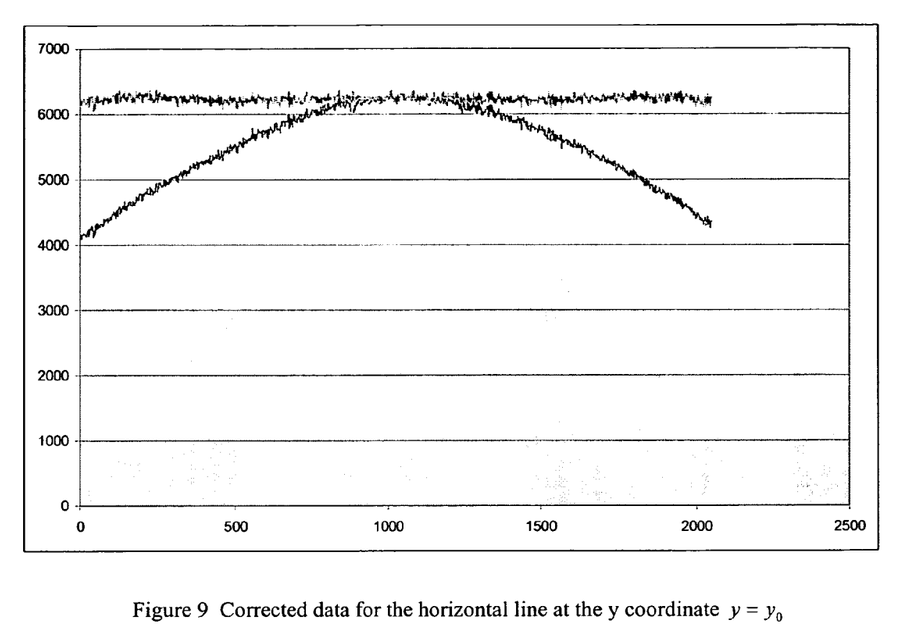

FIG. 9 shows the horizontally corrected data for the horizontal line at the y coordinate $y=y_0$.

Figure 10:
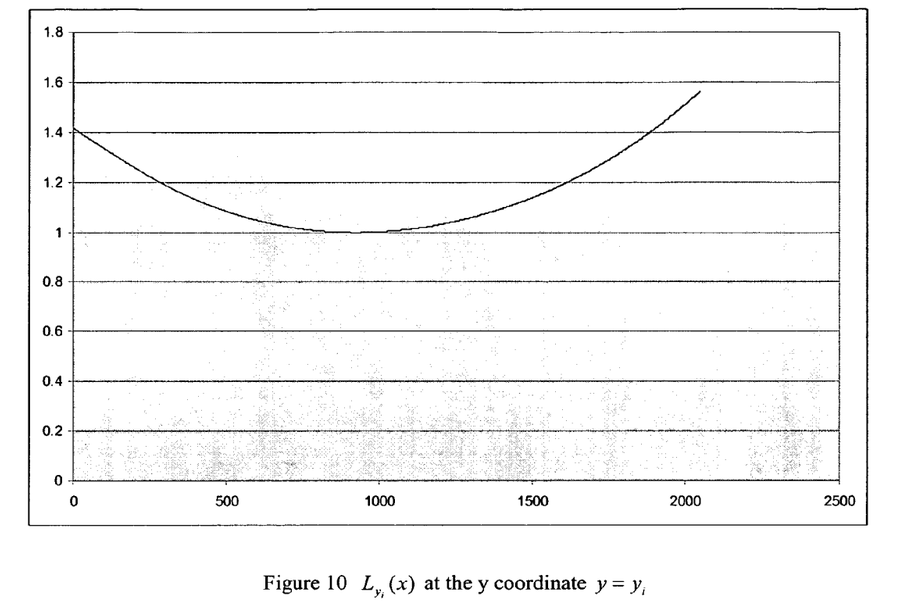

If the process is repeated at a different y coordinate, say $y=y_i$, then the function $L_{y_i}(x)$ for the new horizontal line $y=y_i$ should be different than that at the line $y=y_0$ as shown in FIG. 10. However, the two functions are very similar, and in one embodiment this similarity is the basis for the simplification of the function $C_h(x,y)$. In one embodiment, $C_h(x,y)$ is selected so that it "morphs" the curve $L_{y_0}(x)$ into $L_{y_i}(x)$ as follows:

$$C_h(x,y_i) \times L_{y_0}(x) = L_{y_i}(x)$$

At the center of the lens, the light intensity is brightest and there is no need to apply the lens shading correction at the center. Thus, at the center of the lens $L_h(x)=1$. However, in real applications, the center of the lens is not always at the center of the image. Thus, in one embodiment the center of the lens is determined by looking for the brightest spot in the captured image of a uniform light. If that position is $(x_0, y_0)$, then $$L_h(x) = L_{y_0}(x) \text{ and } L_v(y) = L_{x_0}(y)$$

Thus, $L_h(x)$ and $L_v(y)$ are lens shading correction curves running through the brightest point of the image.

The Function $C_h(x,y)$

Theoretically, the function $C_h(x,y)$ may be computed so that $C_h(x,y_i) \times L_{y_0}(x) = L_{y_i}(x)$, but in reality, computing $C_h(x,y)$ in this manner is computationally more expensive than the original 2D correction function $L(x, y)$. Thus, in one embodiment of the invention $C_h(x,y)$ is not calculated exactly, but instead $C_h(x,y)$ is approximated.

In one embodiment, the function $L_{y_i}(x)$ at the y coordinate $y=y_i$ from the captured image data is approximated from the function $L_{y_0}(x)$ as follows:

1. First, the source correction function $L_{y_0}(x)$ is divided into two segments at the lowest point.
2. The target correction function $L_{y_i}(x)$ is also cut into two segments at the lowest point.
3. The first segment is morphed or transformed from the source correction function into the target correction function by scaling the first end point in the vertical direction, and the second end point in the horizontal direction.
4. Similarly, the second segment is morphed from the source correction function into the target correction function by scaling the first end point in the horizontal direction, and the second end point in the vertical direction.

Figure 11:
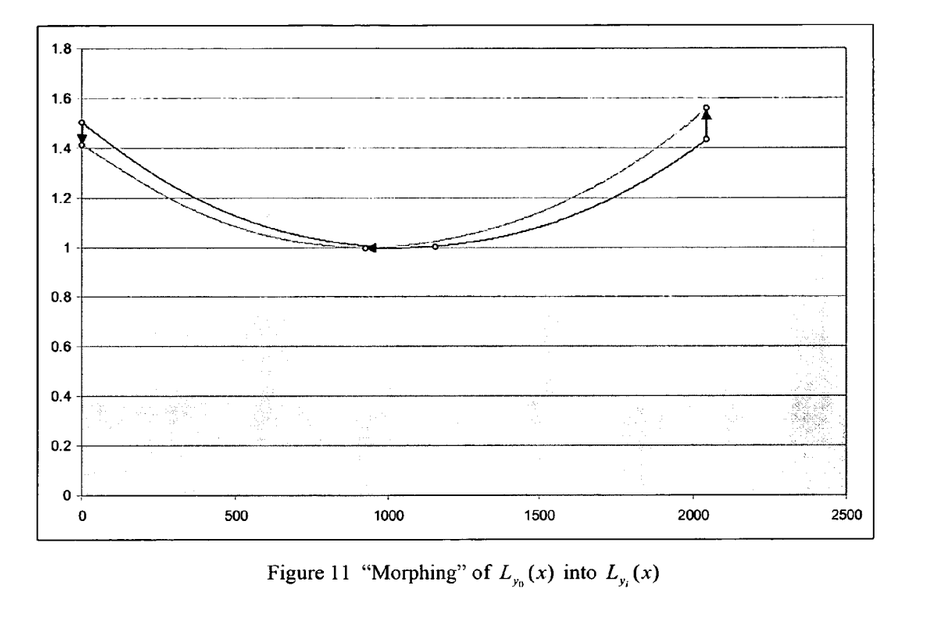

FIG. 11 illustrates the transformation or morphing of the two functions. Using this morphing technique, it is not necessary to store or model the target correction function. Only the scaling parameters are stored. Thus, storage required to implement the techniques of the present invention is minimal. The scaling computation is not complex as it requires only additions and multiplications.

For a perfectly aligned lens, the lowest points of the source and target functions are the same, so the horizontal scaling is not necessary. Furthermore, the left and right end points of the correction curve usually need to be bent uniformly. For such a lens, duplicated or unused scaling parameters may be eliminated, in one embodiment.

Figure 12:
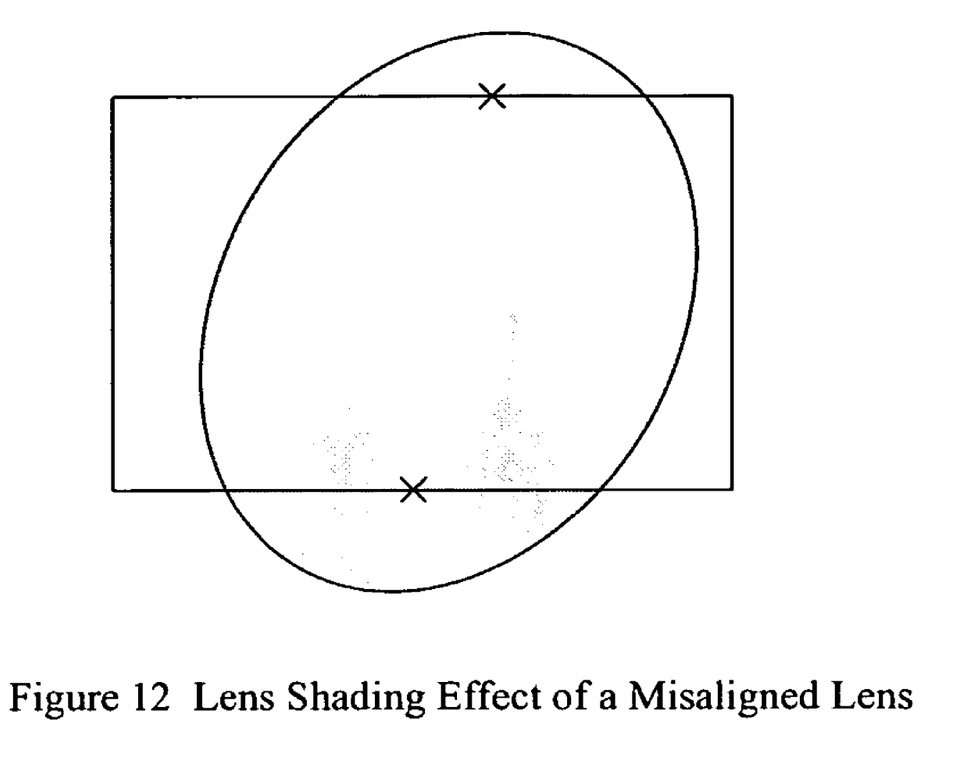

For a tilted lens, the lens shading artifact has an elliptical shape. In this case, the tilted angle normally does not align with the edges of the image sensor, so the lowest points of the source and target functions are different as shown by the two X's in FIG. 12. This problem may be overcome by cutting the correction curves at the lowest points, and treating them as two different segments. For misaligned and tilted lens, the two end points also bend differently, but again, segmenting the curve and bending the segments differently solves the problem.

Figure 13:
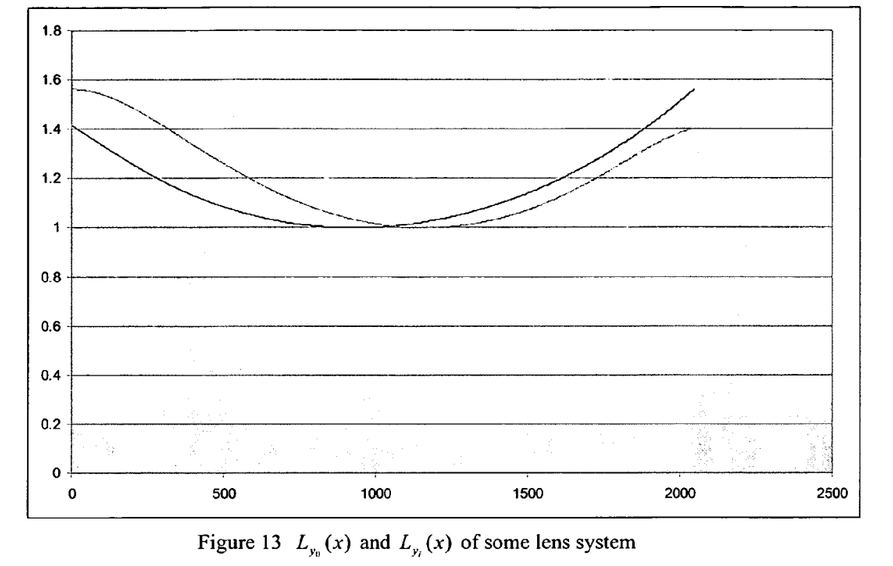
Figure 14:
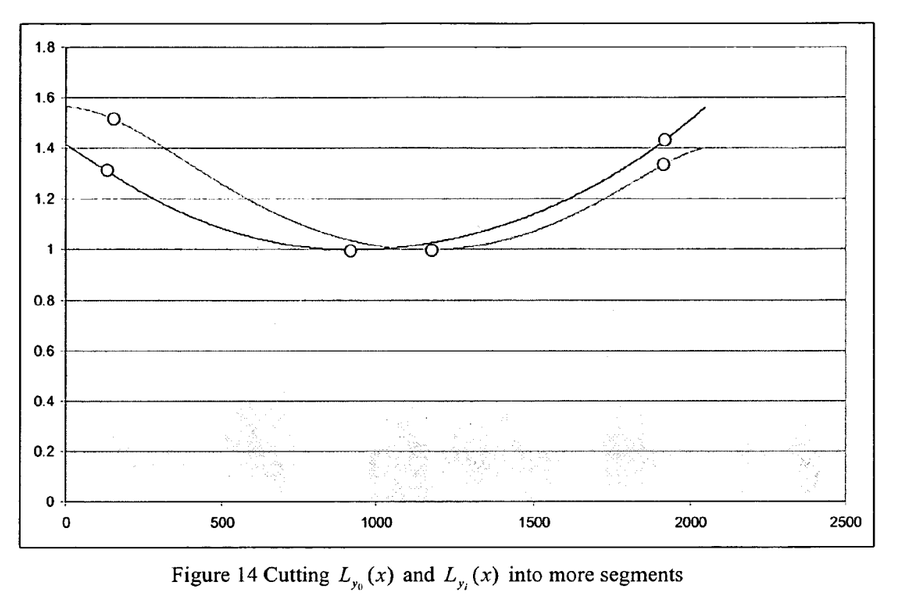

For some lens systems with multiple lenses, the source and target correction functions might differ a lot at the ends as can be seen from FIG. 13 of the drawings. In FIG. 13, it is to be observed that one of the curve bends down toward the ends, while the other one does not. To fix this problem, in one embodiment, the correction curves are cut into more segments, each of which is morphed independently as shown in FIG. 14.

As discussed earlier, the morphing reduces the complexity of the function $L_{y_i}(x)$ into a few scaling parameters. This reduces the storage and computation for the line $y=y_i$. In one embodiment, this process may be repeated for every line in the image. In another embodiment, the scaling parameters between the lines are morphed, for example by linear interpolation. Thus, in one embodiment only the scaling parameters for the top and bottom rows are stored. For each row between the top row and the row $y=y_0$, the scaling parameter is interpolated between the value for the top row and a value of 1 (the scaling parameters for the row $y=y_0$). Similarly, for each row between $y=y_0$ and the bottom row, the scaling parameter is interpolated between a value of 1 and the value for the bottom row Even though the horizontal and vertical lens shading corrections are two independent steps, care must be taken to avoid one from overcorrecting the image after the other. Thus, for example, in one embodiment if $C_h(x,y)$ and $L_h(x)$ are computed first, then $C_h(x,y)$ and $L_h(x)$ are applied first to the image, then $C_v(x,y)$ and $L_v(y)$ are applied to the corrected image, instead of the original one.

Digital cameras typically capture only one color per pixel. To be able to reconstruct the captured data into color images, the sensor pixels are divided into 3 or 4 different colors. Because the lens shading corrections are usually different for different captured colors, embodiments of this invention may be applied to color images by using 3 or 4 independent sets of lens shading correction functions.

What is claimed is:

1. A method for correcting image data for a captured image for lens shading artifacts, the method comprising:
   determining a plurality of one dimensional correction curves that can be applied to the image data to correct for lens shading artifacts therein, comprising determining a first set of correction curves comprising a correction curve for each y coordinate in the image data; and determining a second set of correction curves comprising a correction curve for each x coordinate in the image data; and
   correcting the image data for lens shading artifacts based on the one dimensional curves.

2. The method of claim 1, wherein determining the first set of correction curves comprises determining an exact correction curve $L_{y_i}(x)$ for a y coordinate $y=y_0$; and for each y coordinate $y_i \neq y_0$ determining an approximated correction curve $L_{y_i}(x)$ based on the exact correction curve.

3. The method of claim 2, wherein determining an approximated correction curve $L_{y_i}(x)$ based on the exact correction curve comprises selecting at least two segments in the exact correction curve; and determining scaling parameters to morph each segment into a corresponding segment in the approximated curve.

4. The method of claim 3, further comprising storing scaling parameters for a top and a bottom row in the image data and determining the scaling parameters for the intermediate rows by interpolation.

5. The method of claim 1, wherein determining the second set of correction curves comprises determining an exact correction curve $L_{x_i}(y)$ for an x coordinate $x=x_0$; and for each x coordinate $x_i \neq x_0$ determining an approximated correction curve $L_{x_i}(y)$ based on the exact correction curve.

6. The method of claim 5, wherein determining an approximated correction curve $L_{x_i}(y)$ based on the exact correction curve comprises selecting at least two segments in the exact correction curve; and determining scaling parameters to morph each segment into a corresponding segment in the approximated curve.

7. The method of claim 6, further comprising storing scaling parameters for a leftmost and a rightmost column in the image data and determining the scaling parameters for the intermediate columns by interpolation.

8. The method of claim 2, wherein the coordinate $y=y_0$ runs through a brightest spot in the image data.

9. The method of claim 5, wherein the coordinate $x=x_0$ runs through a brightest spot in the image data.

10. An image processor, comprising:
    an image buffer to store image data for a captured image; and
    lens shading correction logic to perform a method for correcting image data for lens shading artifacts, the method comprising:
    determining a plurality of one dimensional correction curves that can be applied to the image data to correct for lens shading artifacts therein comprising determining a first set of correction curves comprising a correction curve for each y coordinate in the image data; and determining a second set of correction curves comprising a correction curve for each x coordinate in the image data; and
    correcting the image data for lens shading artifacts based on the one dimensional curves.

11. The image processor of claim 10, wherein determining the first set of correction curves comprises determining an exact correction curve $L_{y_i}(x)$ for a y coordinate $y=y_0$; and for each y coordinate $y_i \neq y_0$ determining an approximated correction curve $L_{y_i}(x)$ based on the exact correction curve.

12. The image processor of claim 11, wherein determining an approximated correction curve $L_{y_i}(x)$ based on the exact correction curve comprises selecting at least two segments in the exact correction curve; and determining scaling parameters to morph each segment into a corresponding segment in the approximated curve.

13. The image processor of claim 12, the method for correcting the image data further comprises storing scaling parameters for a top and a bottom row in the image data and determining the scaling parameters for the intermediate rows by interpolation.

14. A camera system, comprising:
    camera optics;
    an image sensor positioned so that light passing through the camera optics impinges on the image sensor; and
    an image processor coupled to the image sensor to receive image data for a captured image therefrom, wherein the image processor comprises lens shading correction logic to perform a method for correcting the image data for lens shading artifacts, the method comprising:
    determining a plurality of one dimensional correction curves that can be applied to the image data to correct for lens shading artifacts therein, comprising determining a first set of correction curves comprising a correction curve for each y coordinate in the image data; and determining a second set of correction curves comprising a correction curve for each x coordinate in the image data; and
    correcting the image data for lens shading artifacts based on the one dimensional curves.

15. The camera system of claim 14, wherein determining the first set of correction curves comprises determining an exact correction curve $L_{y_i}(x)$ for a y coordinate $y=y_0$; and for each y coordinate $y_i \neq y_0$ determining an approximated correction curve $L_{y_i}(x)$ based on the exact correction curve.

16. The camera system of claim 15, wherein determining an approximated correction curve $L_{y_i}(x)$ based on the exact correction curve comprises selecting at least two segments in the exact correction curve; and determining scaling parameters to morph each segment into a corresponding segment in the approximated curve.

17. The camera system of claim 16, wherein the method for correcting the image data further comprises storing scaling parameters for a top and a bottom row in the image data and determining the scaling parameters for the intermediate rows by interpolation.

* * * * *